United States Patent
Thebault et al.

(10) Patent No.: US 9,815,437 B2
(45) Date of Patent: Nov. 14, 2017

(54) ASSEMBLY OF AN ARM HEAD AND OF AN ADAPTER FOR A WINDSCREEN WIPER SYSTEM, CORRESPONDING ADAPTER AND CORRESPONDING ARM HEAD AND WIPER SYSTEM OBTAINED

(71) Applicant: Valeo Systèmes d'Essuyage, Le Mesnil Saint Denis (FR)

(72) Inventors: Denis Thebault, Clermont Ferrand (FR); Xavier Bousset, Mezel (FR); Gilles Petitet, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 119 days.

(21) Appl. No.: 14/300,687

(22) Filed: Jun. 10, 2014

(65) Prior Publication Data

US 2014/0366303 A1 Dec. 18, 2014

(30) Foreign Application Priority Data

Jun. 12, 2013 (FR) ..................................... 13 55426

(51) Int. Cl.
  *B60S 1/40* (2006.01)
  *B60S 1/38* (2006.01)
  *B60S 1/52* (2006.01)

(52) U.S. Cl.
  CPC ............... *B60S 1/40* (2013.01); *B60S 1/3862* (2013.01); *B60S 1/4048* (2013.01); *B60S 1/524* (2013.01); *B60S 2001/4054* (2013.01); *B60S 2001/4093* (2013.01)

(58) Field of Classification Search
  CPC ............ B60S 1/4048; B60S 2001/4051; B60S 2001/4054; B60S 1/4045
  USPC ......................................................... 15/250.32
  See application file for complete search history.

(56) References Cited

U.S. PATENT DOCUMENTS

| | | | |
|---|---|---|---|
| 5,065,474 A * | 11/1991 | Charng | ..................... B60S 1/40 15/250.31 |
| 8,782,846 B2 | 7/2014 | Schaeuble et al. | |
| 2007/0226940 A1* | 10/2007 | Thienard | ............... B60S 1/4038 15/250.32 |

(Continued)

FOREIGN PATENT DOCUMENTS

| | | |
|---|---|---|
| CN | 101863265 A | 10/2010 |
| DE | 10347637 A1 | 5/2005 |
| DE | 102011001688 A1 | 10/2012 |

(Continued)

OTHER PUBLICATIONS

Search Report issued in the counterpart European Patent Application No. 14169935.5, dated Jun. 16, 2015 (4 pages).

(Continued)

*Primary Examiner* — Andrew A Horton
(74) *Attorney, Agent, or Firm* — Osha Liang LLP

(57) ABSTRACT

The invention relates to an assembly (22) of an arm head T and of an adapter (2) for a vehicle windscreen wiper system, the said adapter (2) being configured so that a connector of a wiper of the wiper system can be mounted rotatably on the said adapter (2) by means of at least one flexible tongue (2b) of the adapter able to establish a pivot connection with the said connector, the said assembly (22) being configured to immobilize the said tongue (2b) after mounting the wiper in the arm head T.

15 Claims, 3 Drawing Sheets

(56) References Cited

U.S. PATENT DOCUMENTS

Figure 1:
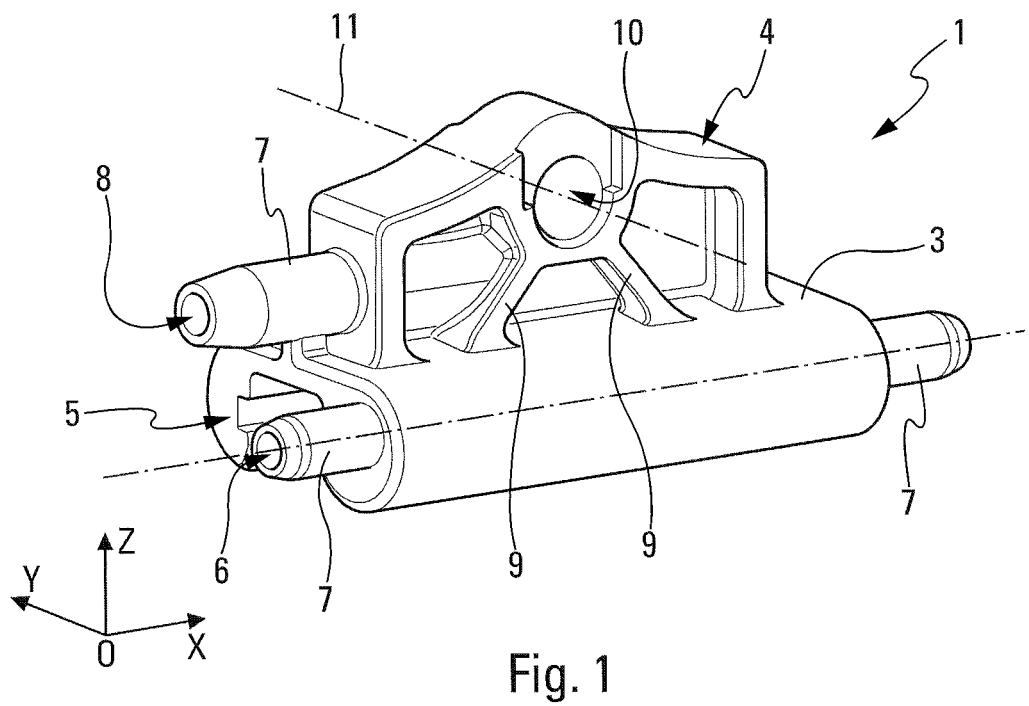

2012/0246859 A1* 10/2012 Schaeuble ............. B60S 1/3849
15/250.32

FOREIGN PATENT DOCUMENTS

| FR | 2759048 A1 | 8/1998 |
|----|------------|--------|
| KR | 101561307 B1 | 10/2015 |
| WO | 2005039944 A1 | 5/2005 |

OTHER PUBLICATIONS

The First Office Action issued in corresponding Chinese Application No. 201410376509.6, dated Jun. 15, 2017 (19 pages).

* cited by examiner

ASSEMBLY OF AN ARM HEAD AND OF AN ADAPTER FOR A WINDSCREEN WIPER SYSTEM, CORRESPONDING ADAPTER AND CORRESPONDING ARM HEAD AND WIPER SYSTEM OBTAINED

The present invention relates to an assembly of an arm head and of an adapter for a vehicle windscreen wiper system, to the corresponding adapter and to the corresponding arm head, and to a wiper system comprising these elements.

Motor vehicles are commonly equipped with windscreen wiper systems for wiping and washing the windscreen and avoiding disruption to the driver's view of his surroundings. These windscreen wipers are conventionally driven by an arm which carries out an angular to-and-fro movement and have elongate wipers which themselves carry squeegee blades made of an elastic material. These blades rub against the windscreen and evacuate the water by removing it from the driver's field of view. The wipers are produced in the form either, in a conventional version, of articulated yokes which hold the squeegee blade at a number of discrete locations or, in a more recent version, known as the "flat blade" version, of a semi-rigid assembly which holds the squeegee blade along its entire length. In this second solution, the wiper is attached to the turning arm of the windscreen wiper by an assembly consisting of a mechanical connector and of an adapter. The mechanical connector is a part which is crimped directly onto the flat blade, while the adapter is an intermediate part which allows the connector to be fastened to the windscreen wiper arm. These two parts are connected to one another by a transverse pin which allows their relative rotation, in a plane perpendicular to the windscreen and passing through the arm.

It is known practice to connect the connector and the adapter by fitting a transverse pin through these two parts, after alignment of the latter. Such a technical solution has a number of disadvantages. Specifically, the pivot connection which results from this mounting thus makes use of three separate parts. The transverse pin is a metal part, which represents a non-negligible cost. Moreover, the use of these three parts results in complications in terms of logistics when assembling the adapter on the connector. Furthermore, it is necessary to secure the positioning of the pin in its housing to prevent it from escaping therefrom.

The aim of the present invention is to solve the above-described disadvantages mainly by omitting the separate transverse pin which provides the pivot connection between the adapter and the connector. According to the invention, this transverse pin emanates directly from the adapter, and does thus not form an additional part which has to be mounted and managed logistically.

Accordingly, the invention provides an assembly of an arm head and of an adapter for a vehicle windscreen wiper system, the said adapter being configured so that a connector of a wiper of the wiper system can be mounted rotatably on the said adapter by means of at least one flexible tongue of the adapter able to establish a pivot connection with the said connector, the said assembly being configured to immobilize the said tongue after mounting the wiper in the arm head.

It is additionally found that, by virtue of the invention, the said tongue remains in the immobilized position after mounting the wiper in the head of the arm and does not risk breaking the pivot connection between the adapter and the connector by separating from the connector.

According to other features of the invention which may be taken alone or in combination:

the said tongue is formed laterally on the adapter, that is to say along a lateral edge of the adapter, the said tongue is configured to cooperate following the said pivot connection with a cavity of the connector, the said adapter comprises two said tongues, arranged in opposition to define an axis of articulation of the connector on the adapter, the said tongues are identical, in particular symmetrical to one another relative to a median plane of the adapter, the tongue or the said tongues bear against the arm head, in particular against an internal surface of the latter, the tongue or the said tongues are provided with an extension able to bear against the arm head, in particular against the said internal surface of the arm head, the said extension is a finger, in particular a finger extended laterally towards the outside of the said adapter, the said arm head is in the form of a clevis comprising two side walls defining a housing for the adapter, the said internal surface being that of one and/or the other of the said side walls, the said internal surface is a rim of the arm head, for example a rim of a guiding and/or retaining ramp for mounting the adapter in the arm head, the said adapter comprises at least one window for allowing the said bearing of the tongue through the window after mounting the wiper in the arm head, the said adapter comprises a body in the form of a clevis provided to be inserted during mounting in the said housing of the arm head, the said clevis of the body of the adapter comprising two lateral wings of which at least one of them comprises the window or one of the said windows, the said body comprises an upper face from which the tongue or the said tongues emanate, the tongue or the said tongues extend parallel to the said lateral wings, the said window is an orifice of closed contour of a wall of the said body of the adapter, in particular of one of its lateral wings, the said window is a notch of a lower edge of the said body of the adapter, in particular of one of its lateral wings, the tongue or the said tongues are configured to allow the engagement of the said pivot connection of the tongue or the said tongues with the connector during mounting of the wiper in the adapter, for example with the aid of at least one guiding chamfer, the tongue or the said tongues are formed in a single piece with the adapter, the tongue or the said tongues are integrally moulded with the adapter, the said adapter is made of plastic, the said housing of the arm head is configured to receive the said adapter, in a translational movement of the adapter on the arm head, in a longitudinal direction of the arm head.

The invention also relates to an adapter of the said assembly, as described above, the tongue or the said tongues being provided with the extension able to bear against the arm head.

The invention further relates to an arm head of the said assembly, the said arm head comprising a retaining device for immobilizing the said tongue after mounting the wiper in the arm head.

Thus, the invention relates in particular to an adapter for a vehicle windscreen wiper system, the said adapter being configured so that a connector of a wiper of the wiper system can be mounted rotatably on the said adapter by means of at least one flexible tongue of the adapter able to establish a pivot connection with the said connector, and to immobilize the said tongue after mounting the wiper in an arm head of the wiper system.

The tongue or the said tongues are provided with an extension able to bear against an internal surface of the arm head.

The invention also relates to a wiper comprising a wiper blade, a connector and a support of the said wiper blade and of the connector, provided configured to cooperate with an adapter as described above. The connector which participates in the mechanical connection between the wiper and the wiper-holder arm is situated in a median manner on the wiper, along a longitudinal axis of the wiper. In other words, the wiper can be a wiper of the flat type without yokes.

According to various embodiments of the said connector:
the said cavity of the connector is formed in a body of the connector, in particular in a substantially central portion of the latter,
the said cavity is a through-cavity,
the said cavity accommodates the tongues of the adapter at each of its openings.

The invention also relates to a wiper system comprising an assembly and/or a wiper, as described above. The said system may in particular comprise a connector mounted rotatably on the adapter of the said assembly.

Figure 2:
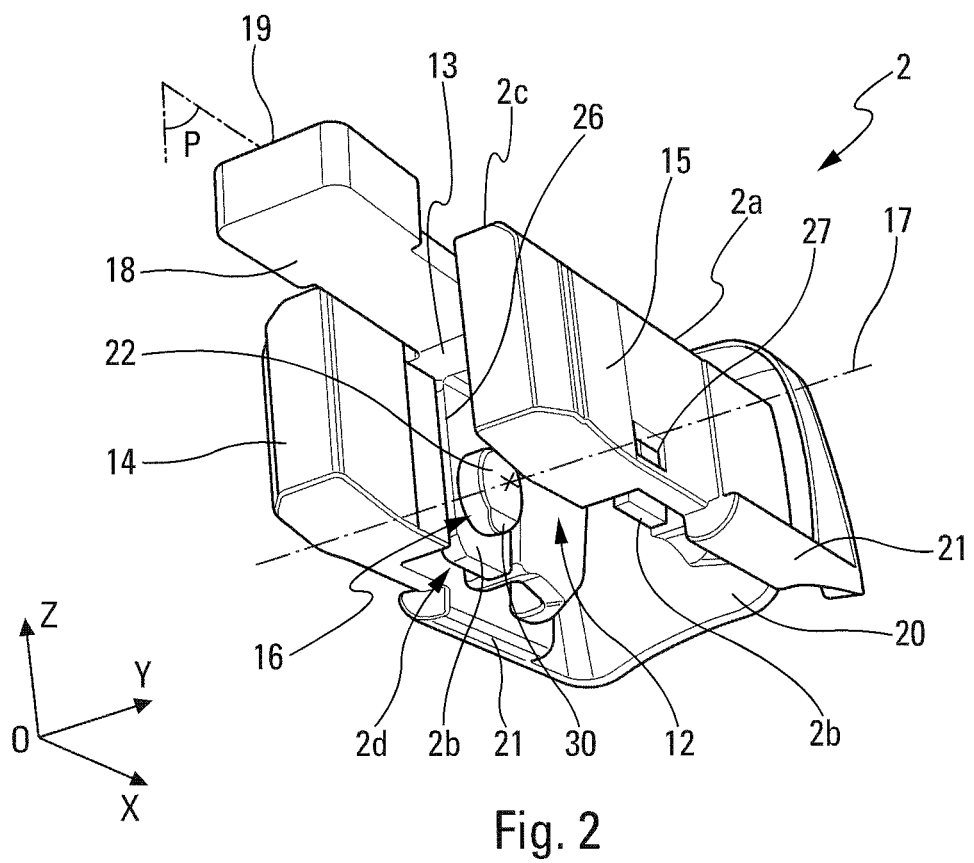
Figure 3:
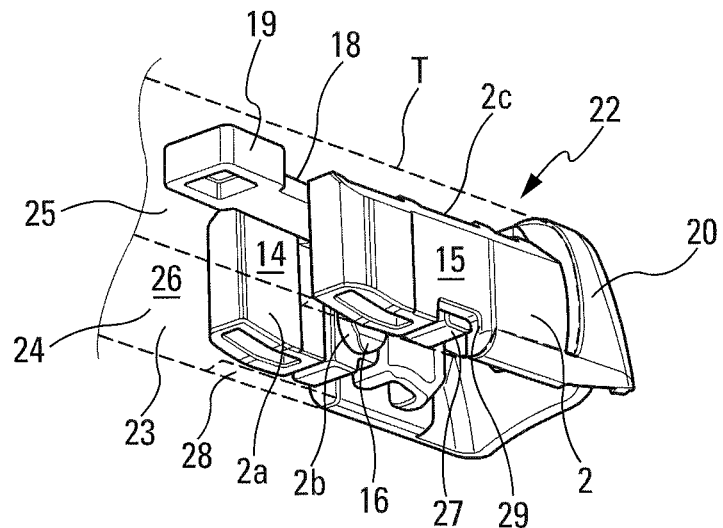
Figure 4:
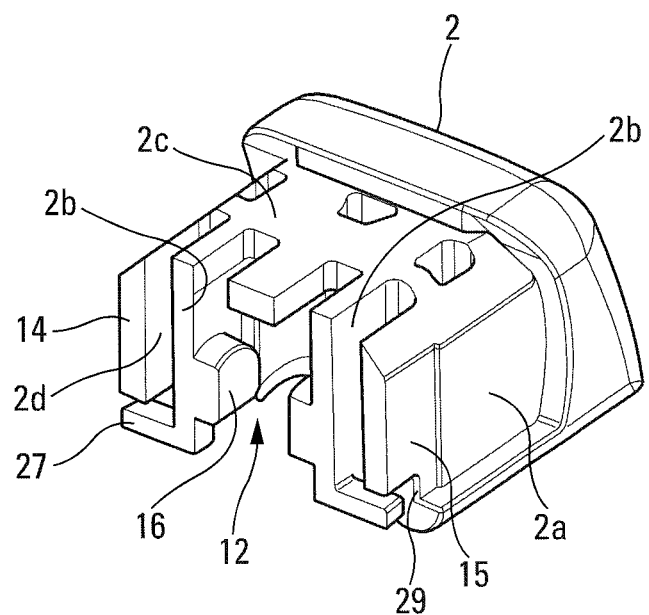
Figure 5:
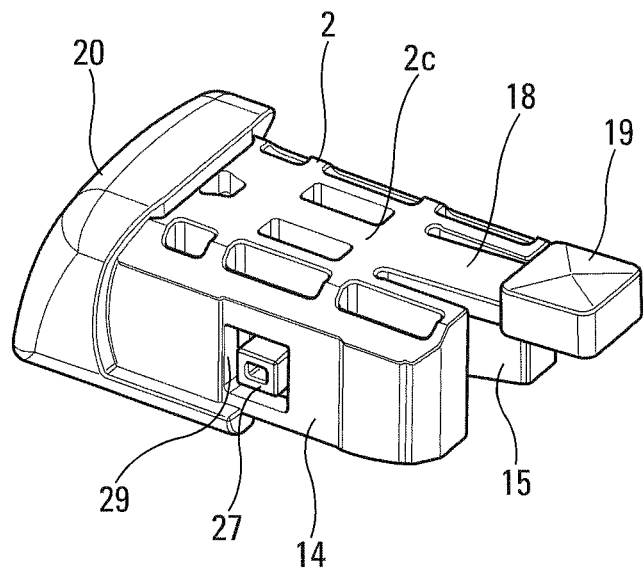
Figure 6:
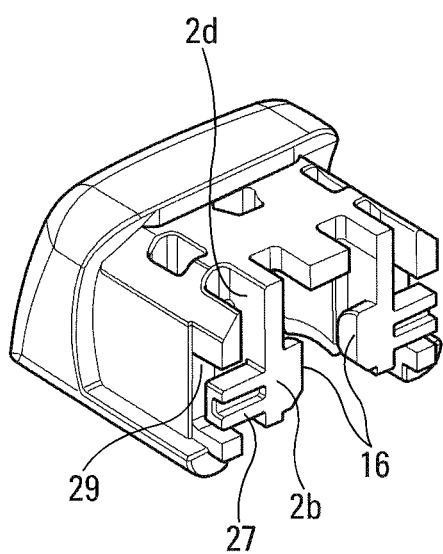

Other features and advantages of the invention will become apparent from reading the following description of exemplary embodiments given by way of illustration with reference to the appended figures. In these figures:

FIG. 1 is a perspective view of a connector forming part of the wiper system according to the invention, FIGS. 2 and 5, on the one hand, and FIG. 3, on the other hand, are perspective views of variant embodiments of an adapter forming part of the wiper system according to the invention, and FIGS. 4 and 6 are cross-sectional views, in perspective, of the adapters of FIGS. 3 and 5, respectively.

In the remainder of the description, the longitudinal or lateral denominations refer to the orientation of the arm on which the windscreen wiper blade is mounted. The longitudinal direction corresponds to the main axis of the arm in which it extends, while the lateral orientations correspond to concurrent straight lines, that is to say lines which intersect the longitudinal direction, in particular which run perpendicular to the longitudinal axis of the arm and parallel to the windscreen of the vehicle equipped. As regards the longitudinal directions, the front denomination denotes the direction starting from a proximal end towards a distal end of the blade-holder arm and the rear denomination denotes the opposite direction. Furthermore, the directions referenced as upper or lower correspond to orientations perpendicular to the plane of rotation of the wiper-holder arm, the lower denomination containing the plane of the windscreen.

Finally, identical reference numbers are used to denote identical or similar elements.

The connection system according to the invention comprises a connector 1 illustrated in FIG. 1 combined with an adapter 2 represented in the following figures. These two parts are defined in an orthonormic reference frame OX-OY-OZ, where the direction OX represents a longitudinal axis, the direction OZ represents a vertical axis and the direction OY represents a transverse axis.

The connector 1 shown in FIG. 1 is designed to be secured, for example by crimping, to a wiper (not shown) which moves over a vehicle windscreen. Such a wiper is rotated by a wiper arm of which only an arm head T is represented in dashed lines in FIG. 3.

The connector 1 provides a "complete" mechanical connection with the wiper, in the sense that there is no degree of freedom. The connector 1 can also provide a function of transporting and dispensing a windscreen-washing liquid.

The connector 1 here comprises a base 3 which extends longitudinally and transversely. This base 3 forms a support of a wiper blade (not shown) of the wiper and comprises a zone 5 for securing on the wiper, and more particularly on a vertebra of this wiper. This securing zone 5 takes, for example, the form of a groove formed in the base 3, this groove being bordered by two hooks able to engage on the wiper. The base also receives a duct 6 which extends in a rectilinear manner along the longitudinal axis OX. Such a duct 6 is formed on one side of the base 3, from which there emerge two end-pieces 7 on which there is fitted a washing-liquid dispensing means forming part of the wiper. As a variant, there may be provided another washing-liquid dispensing duct along the other side of the base so as to allow the wiper to be supplied with liquid along each of its sides via each of the ducts, advantageously so as to alternately spray the liquid in the upward or downward direction of the wiper.

The base 3 is surmounted by a flank 4, for example emanating from this base 3. This flank 4 has a transverse dimension and a longitudinal dimension which are smaller than those of the base 3. The flank 4 is, for example, centred on the base 3, along the transverse axis OY and the longitudinal axis OX.

The flank 4 receives a flow channel 8 by which the washing liquid can arrive. Such a channel 8 is thus delimited by the flank 4 and by an end-piece 7 which emerges on the flank 4, and on which there is fitted a tube for transporting the windscreen-washing liquid.

It will be noted that the flank 4 can have a plurality of ribs 9 which serve to mechanically reinforce the flank 4.

The connector 1 and the adapter 2 are mechanically connected by a pivot connection. As far as the connector 1 is concerned, this pivot connection is implemented by a cavity 10 made in the flank 4. This cavity 10 extends along the transverse axis OY and has a circular cross section. In other words, the cavity 10 can be a hole with a central axis 11, the latter being parallel to the transverse axis OY. In the plane OXZ, the cavity 10 has a circular cross section.

The connector 1 described above is advantageously unitary, that is to say formed by one and the same synthetic material. This connector can thus be manufactured during a single moulding operation, in particular by injection moulding.

The following figures show the adapter 2, the latter being a part whose shapes are adapted to the shapes formed at one end of the wiper arm, namely the head T of the arm. Thus, the connection system according to the invention can be used for different types of wiper arms, the particular shapes of each arm being carried out to the adapter 2, while the connector 1 remains identical whatever the type of wiper arm used.

The adapter 2 comprises a body 2a in the form of a clevis which has a U-shaped cross section in a plane OYZ. This shape delimits a housing 12 in which the flank 4 of the connector 1 is inserted.

The adapter 2 therefore comprises an upper face 2c from which there extends a first side or lateral wing 14 and a second side or lateral wing 15. The housing 12 is thus bordered by the upper face 2c, by the lateral wing 14 and by the lateral wing 15.

As far as the adapter 2 is concerned, the pivot connection is provided by at least one protuberance 16 of a flexible tongue 2b of the adapter which is housed in the cavity 10 formed in the connector 1. The protuberance 16 thus forms a male part which enters a female shape, the latter being the cavity 10. It will also be noted that the protuberance 16 is formed projecting from the tongue 2b, towards the inside of the housing 12. In the plane OXZ, the protuberance 16 has a circular cross section substantially complementing that of the cavity 10.

According to the exemplary embodiment, the adapter 2 comprises two protuberances 16 on two opposite tongues 2b which face one another. These two protuberances each form a circular torus 22 coaxial on a torus axis 17. Once the adapter 2 is assembled on the connector 1, the torus axis 17 is coincident with the central axis 11 of the cavity or cavities 10.

A locking arm 18 here emerges on the upper face 2c of the adapter 2. Such a locking arm 18 provides locking along the longitudinal axis OX of the adapter 2 with respect to the wiper arm, such a locking arm being terminated by a block 19 which cooperates with a hole formed in the arm head T.

At the other longitudinal end of the adapter 2, there can be found a cap 20 whose function is to close the housing 12 in order to hide the mechanical connection between the connector 1 and the adapter 2.

At a free end of the lateral wings 14 and 15, there can be found an edge 21 whose function is to provide a stop along the longitudinal axis OX against the arm head T.

The invention also relates to the assembly 22 of the arm head T and of the adapter 2, the said adapter 2 being configured, as already stated, so that the connector 1 can be mounted rotatably on the said adapter 2 by means of the flexible tongue or the said flexible tongues 2b so as to establish the said pivot connection with the said connector. According to the invention, the said assembly 22 is additionally configured to immobilize the tongue or the said tongues 2b after mounting the wiper in the arm head.

Thus, the said tongue 2b remains in an immobilized position after mounting the wiper in the head of the arm and does not risk breaking the pivot connection between the adapter 2 and the connector 1 by separating from the connector.

The tongue or the said tongues 2b may be formed laterally on the adapter, in particular in the housing 12, while being configured to cooperate following the said pivot connection with the cavity 10 of the connector.

As mentioned above, the said adapter 2 comprises two said tongues 2b, arranged in opposition to define an axis of articulation of the connector on the adapter, namely the axis 17 coincident with the axis 11. These tongues 2b may be identical, in particular symmetrical to one another relative to a median plane P of the adapter.

The tongue or the said tongues 2b here bear, after mounting the wiper in the arm head, against the arm head T, in particular against an internal surface 23 of the latter.

The said arm head T is for example in the form of a clevis comprising two side walls 24, 25 defining a housing 26 for the adapter. The said internal surface 23 is then that of one and/or the other of the said side walls 24, 25.

The tongue or the said tongues 2b are advantageously provided with an extension 27 able to bear against the arm head T, in particular against the said internal surface 23 of the arm head. This extension is advantageously a finger 27, in particular a finger extended laterally towards the outside of the said adapter. This finger 27 is advantageously able to bear against one of the said two side walls 24, 25, in particular the internal surface 23 of a said side wall.

The said internal surface 23 can also be a rim 28 of the arm head, for example a rim of a guiding and/or retaining ramp for mounting the adapter in the arm head.

The said adapter here comprises at least one window 29, as represented in FIGS. 3 and 5, to allow the said bearing of the tongue after mounting the wiper in the arm head. This window 29 is provided on at least one of the lateral wings 14, 15 of the body 2a of the adapter. According to the example of FIG. 5, the said window 29 is an orifice of closed contour of a wall of the said body 2a of the adapter, in particular of one of its lateral wings. According to the example of FIG. 3, the said window 29 is a notch of a lower edge of the said body of the adapter, in particular of the edge 21 of one of its lateral wings. The finger 27 passes through the said window and/or notch 29 to bear against the arm head.

The body 2a of the adapter additionally comprises the upper face 2c from which there emanate, for example, the tongue or the said tongues 2b. The tongue or the said tongues 2b extend, preferably, parallel to the said lateral wings 14, 15, in particular at a distance from each of the corresponding lateral wings 14, 15, in the housing 12.

The tongue or the said tongues 2b are advantageously configured to allow the engagement of the said pivot connection of the tongue or the said tongues with the connector when mounting the wiper in the adapter with the aid of at least one guide chamfer 30, for example arranged at the lower level of the protuberance 16 to facilitate bending of the tongue 2b during engagement in the cavity 10, in a recess 2d of the corresponding lateral wing.

The tongue or the said tongues 2b are formed here in a single piece with the adapter, being advantageously integrally moulded with the adapter, for example in plastic.

The housing 26 of the arm head is configured to receive the said adapter 2, in particular in a translational movement of the adapter on the arm head, in a longitudinal direction of the arm head, namely along the axis OX. In this translational movement, the adapter slides longitudinally in the arm head, being held along the axis OZ by a lower rim facing towards the inside of the arm head. In this regard, the said arm head may comprise two said guide ramps, each emanating from one of the side walls 24, 25 of the said arm head and folded laterally towards one another, that is to say towards the housing 26 of the arm head. These guide ramps thus each form a folded edge emanating from the side wall in question.

In particular, the said assembly 22 advantageously comprises a median plane of symmetry coincident with the median plane P of the adapter.

The way in which the wiper system is mounted is now described.

This involves, in a first step, engaging the adapter 2 on the connector 1, in a vertical translational movement or along the axis OZ of the adapter on the connector where the tongues 2b are brought simultaneously on each side of the flank 4 of the connector in the direction of the opposite openings of the cavity 10. The tongues move apart outwardly in this movement along the said flank, in the separation 2d of the corresponding lateral wing, and then, when they arrive in the cavity openings, they are returned inwardly, by the snap-fastening effect owing to the elastic characteristic of the material of the tongues, where they engage in the openings of the cavity. The adapter is then mounted on the connector equipped with its wiper and the assembly can now be mounted on the arm head, in a longitudinal sliding movement, along the axis OX, of the assembly in the arm head.

The lateral extensions 27 of the tongues slide along the corresponding side walls 24, 25 and, at the end of the sliding movement, they bear on the internal surface 23 of each of the side walls of the arm head, immobilizing the external lateral movement of the tongues, which thereby prevents their protuberance 16 from leaving the cavity 10 to break their rotational engagement with the latter.

As a variant, the lateral extensions can be formed on the arm head, in particular on its side walls. They may in particular comprise a finger facing inwardly to cooperate with grooves or apertures of the adapter able to receive the said protuberances in order to immobilize the said flexible tongues so as to provide the pivot connection between the connector and the adapter.

The invention thus provides a simple and reliable solution for assembling an adapter to a connector in a vehicle windscreen wiper system.

The invention claimed is:

1. An assembly, comprising:
   an arm head and an adapter for a vehicle windscreen wiper system,
   the adapter being configured so that a connector of a wiper of the wiper system is mounted rotatably on the adapter by two flexible tongues of the adapter able to establish a pivot connection with the connector, the assembly being configured to immobilize at least one of the two flexible tongues after mounting the wiper in the arm head,
   wherein the adapter comprises a body in the form of a clevis which has a U-shaped cross section in a plane which delimits a housing for inserting a flank of the connector, said housing bordered by an upper face and two lateral wings,
   wherein the two flexible tongues extend in the housing from the upper face, parallel to the two lateral wings and at a non-zero distance from each of the corresponding two lateral wings;
   wherein the two flexible tongues bear against the arm head.

2. The assembly according to claim 1, where at least one of the two flexible tongues is formed laterally on the adapter and is configured to cooperate following the pivot connection with a cavity of the connector.

3. The assembly according to claim 1, where the two flexible tongues are arranged in opposition to define an axis of articulation of the connector on the adapter.

4. The assembly according to claim 1, wherein the tongues are configured to allow the engagement of the pivot connection of the tongues with the connector during mounting of the wiper in the adapter.

5. The assembly according to claim 1, wherein the tongues are provided with an extension able to bear against an internal surface of the arm head.

6. The assembly according to claim 5, wherein the extension is a finger, extended laterally towards the outside of the adapter.

7. The assembly according to claim 5, wherein the arm head is in the form of a clevis comprising two side walls defining a housing for the adapter, the internal surface being that of one of the side walls.

8. The assembly according to claim 7, wherein the body of the adapter in the form of the clevis is to be inserted during mounting in the housing of the arm head.

9. The assembly according to claim 1, wherein the adapter comprises at least one window for allowing the bearing of at least one of the two flexible tongues through the window after mounting the wiper in the arm head.

10. The assembly according to claim 9, wherein
    the window is an orifice of closed contour of at least one of the lateral wings of the adapter, or
    the window is a notch of a lower edge of at least one of the lateral wings of the adapter.

11. An adapter for a vehicle windscreen wiper system, the adapter being a configured so that a connector of a wiper of the wiper system is mounted rotatably on the adapter by two flexible tongues of the adapter able to establish a pivot connection with the connector, and to immobilize at least one of the two flexible tongues after mounting the wiper in an arm head of the wiper system,
    wherein the adapter comprises a body in the form of a clevis which has a U-shaped cross section in a plane which delimits a housing for inserting a flank of the connector, said housing bordered by an upper face and two lateral wings, and
    wherein the two flexible tongues extend in the housing from the upper face, parallel to the two lateral wings and at a non-zero distance from each of the corresponding two lateral wings;
    wherein the two flexible tongues are provided with an extension able to bear against an internal surface of the arm head.

12. A wiper comprising a wiper blade, a connector and a support of the wiper blade and of the connector, the wiper being configured to cooperate with the adapter according to claim 11.

13. A wiper system comprising:
    an adapter according to claim 11; and
    a wiper comprising a wiper blade, a connector, and a support of the wiper blade and of the connector, the wiper being configured to cooperate with the adapter.

14. The adapter according to claim 11, wherein the adapter comprises at least one window for allowing the bearing of the extension of at least one of the tongues against the internal surface of the arm head through the window.

15. An assembly, comprising:
    an arm head and an adapter for a vehicle windscreen wiper system,
    the adapter being configured so that a connector of a wiper of the wiper system is mounted rotatably on the adapter by at least one flexible tongue of the adapter able to establish a pivot connection with the connector, the assembly being configured to immobilize the at least one flexible tongue after mounting the wiper in the arm head,
    wherein the at least one flexible tongue bears against the arm head, and
    wherein the adapter comprises at least one window for allowing the bearing of the tongue through the window after mounting the wiper in the arm head, the window being an orifice of closed contour of a lateral wing of a body of the adapter.

* * * * *